United States Patent
Anderson et al.

[11] Patent Number: 6,144,722
[45] Date of Patent: Nov. 7, 2000

[54] SYSTEM AND METHOD FOR PROGRAMMABLE TELEPHONE SUBSCRIBER LINE TEST IN RING MODE

[75] Inventors: Jeffrey Jay Anderson; Yan Zhou, both of Austin, Tex.

[73] Assignee: Advanced Micro Devices, INC, Austin, Tex.

[21] Appl. No.: 08/880,008

[22] Filed: Jun. 20, 1997

[51] Int. Cl.[7] .................................................. H04M 1/00
[52] U.S. Cl. ............................ 379/27; 379/399; 379/412
[58] Field of Search ................................. 379/412, 399, 379/1, 2, 10, 24, 26, 27, 30, 403, 413, 398, 21; 340/314 R, 310.01; 324/348, 416, 433, 512, 522

[56] References Cited

U.S. PATENT DOCUMENTS

| | | | |
|---|---|---|---|
| 4,355,209 | 10/1982 | Sabon | 379/27 |
| 4,991,105 | 2/1991 | Pimental | 379/26 |
| 5,222,119 | 6/1993 | Asano | 379/32 |
| 5,511,108 | 4/1996 | Severt et al. | 379/21 |
| 5,606,592 | 2/1997 | Galloway et al. | 379/24 |
| 5,638,440 | 6/1997 | Nix et al. | 379/412 |
| 5,809,109 | 9/1998 | Moyal et al. | 379/412 |

OTHER PUBLICATIONS

Am79212/Am79C202 Advanced Subscriber Line Interface Circuit, Dec. 19, 1995, Chapter 8, 9, and 10.
Understanding Telephones, Julian Macassey, September 1985, pp. 1–9 (Obtained from the Internet at http://jedi.cis.temple.edu:8080/elite/begin/phonewrk.how).

*Primary Examiner*—Wing F. Chan
*Assistant Examiner*—Rexford Barnie
*Attorney, Agent, or Firm*—Williams, Morgan & Amerson

[57] ABSTRACT

A system and method for providing software-implemented, programmable testing of telephone subscriber line power conditions during ring mode. A user-controlled fault detection system for detecting subscriber line faults, including resistive faults and foreign voltages, on a telephone subscriber line during ring mode is provided. A user interface is provided to enter user-programmable threshold values corresponding to subscriber ring mode line fault conditions. A fault threshold memory, coupled to the user interface, is provided to store the generated threshold values. A current level detector identifies a ring mode current during ringing on the telephone subscriber line. A processing unit is configured and arranged to compare the ring mode current on the telephone subscriber line to the generated threshold values stored in the fault threshold memory. A fault is identified in response to the comparison.

15 Claims, 5 Drawing Sheets

SYSTEM AND METHOD FOR PROGRAMMABLE TELEPHONE SUBSCRIBER LINE TEST IN RING MODE

FIELD OF THE INVENTION

The present invention is directed generally to telephone subscriber line power supervision, and more particularly to a system and method for providing software-implemented testing of telephone subscriber line power conditions during ringing using programmable fault thresholds.

BACKGROUND OF THE INVENTION

The telephone subscriber loop is the portion of a telecommunications circuit which connects the central office to the customer premise equipment. The subscriber loop, often referred to as the local loop or "last mile", comprises a two-wire twisted-pair cable to provide full duplex communications between the subscriber and the central office.

The local loop is the most expensive, and perhaps the least technically effective, portion of the entire telecommunications system today. The subscriber loop is the most susceptible to transmission impairment. This is largely due to the subscriber loop being exposed to the elements as it hangs on poles to reach the end user. The local loop cable may also be buried in the ground in conduit, which is susceptible to being inadvertently cut or damaged. In such cases, the current-carrying portion of the cable may become wet, causing communications to degrade or cease to exist altogether.

The principal types of faults which can occur on the subscriber loop are short-circuits, power cross faults, grounds, and open-circuits. For example, a short-circuit would include the tip and ring lines being short-circuited together. A power cross involves a short-circuit between the tip and ring lines of two different telephone lines, or may involve a short-circuit between the telephone line and an electrical power line. A short-circuit between the ring line and ground is considered a ground fault, while a discontinuity in a line is referred to as an open cable pair. Power crosses and grounds are often the result of wet cable, which causes current flow between conductors.

There have traditionally been three categories of telephone subscriber line testing. First, local test desks (LTD) have been used to access a cable pair through the switching system at the central office. The LTD is a manually operated system which accesses the cable pair through a circuit in the switching system that connects the LTD to the line without ringing the telephone. Such a test requires dedicated test circuitry and a test board operator at the central office.

Another type of telephone subscriber line testing is automatic test equipment that accesses local loops through the switching system, similar to that of the LTD tests. Such a test is the line insulation test (LIT), which is performed at the central office by stepping through each telephone line and applying a line test.

Manual loop tests can be performed using a device called a time domain reflectometer (TDR). The TDR locates loop faults by sending a pulse on the telephone line, and displays the reflected pulse which can provide the distance to the fault. TDRs are generally very expensive.

In order to more closely locate the location at which a fault occurs on the telephone line, one must properly distinguish between outside plant troubles and problems with the subscriber's wiring and customer premises equipment (CPE). Network interface devices (NID) have been used at the interface between the telephone subscriber's wiring and the telephone company's equipment. The NIDs help to isolate the problem on the telephone line to the subscriber's wiring. One such subscriber line interface circuit is the advanced subscriber line interface circuit (ASLIC) Am79212/Am79C202 commercially available by Advanced Micro Devices, the assignee of the instant application.

When the telephone connection is in ring mode, the central office provides an indication that an incoming call is being directed to the subscriber. When the subscriber picks up the telephone, the connection is considered "off-hook", and a current is allowed to flow through the local loop. This current is detected, which initiates a "ring trip". A ring trip indicates that the ring signal is discontinued, traditionally by tripping the ring voltage relay. A current flowing during ringing could be a power cross fault, or could be an indication of a normal off-hook condition, either of which should cause a ring trip.

The aforementioned prior art does not provide for flexibility in performing AC and DC fault detection while in ring mode. The prior art requires complex analog and digital circuitry, thereby requiring additional, valuable semiconductor real estate. For example, the prior art does not lend itself to quick and inexpensive modification of fault thresholds.

The present invention provides a manner in which telephone power line faults which occur in ring mode may be monitored at the subscriber interface, while providing flexibility and ease of use. The present invention, therefore, provides a solution to the aforementioned and other shortcomings of the prior art, and provides additional advantages over the prior art.

SUMMARY OF THE INVENTION

Generally, the present invention relates to a system and method for providing software-implemented, programmable testing of telephone subscriber line power conditions during ring mode.

In accordance with one embodiment of the invention, a user-controlled fault detection system for detecting subscriber line faults, including resistive faults and foreign voltages, on a telephone subscriber line during ring mode is provided. A user interface is provided to enter user-programmable threshold values corresponding to subscriber ring mode line fault conditions. A fault threshold memory, coupled to the user interface, is provided to store the generated threshold values. A current level detector identifies a ring mode current during ringing on the telephone subscriber line. A processing unit is configured and arranged to compare the ring mode current on the telephone subscriber line to the generated threshold values stored in the fault threshold memory. A fault is identified in response to the comparison.

In accordance with another aspect of the invention, a user-controlled fault detection system for detecting power cross faults on a telephone subscriber line during ring mode is provided. A current level detector is used to identify a ring mode current during ringing on the telephone subscriber line, and a power computation unit computes a power value for the ring mode current. A user interface is provided to enter user-programmable threshold values corresponding to subscriber line power cross conditions. A comparator compares the power value and a corresponding one of the user-programmable threshold values to provide a ring mode power cross fault when the power value reaches the user-programmable threshold value.

In yet another embodiment of the invention, a method for identifying power cross faults on a telephone subscriber line during ring mode is provided. Software-programmable digital power cross fault threshold values are generated which correspond to telephone subscriber line power cross fault levels in response to user input. Digital signals are generated through digital sampling of actual current signals on the telephone subscriber line. A software-executed comparison is performed of the digital signals collected from the telephone subscriber line and the digital power cross fault threshold values. Ring mode is deactivated when the digital signals surpass the digital power cross fault threshold values.

In another embodiment of the invention, a method for identifying current faults on a telephone subscriber line in ring mode is provided. Ring mode current is identified during ringing on the telephone subscriber line, and is sampled at a sampling rate to provide a corresponding digital ring mode current. A phase-independent digital value corresponding to a phase-independent representation of the digital ring mode current is calculated, which is compared to a programmable power cross threshold value. Where the phase-independent digital value reaches or exceeds the programmable power cross threshold value, the ring mode is deactivated.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
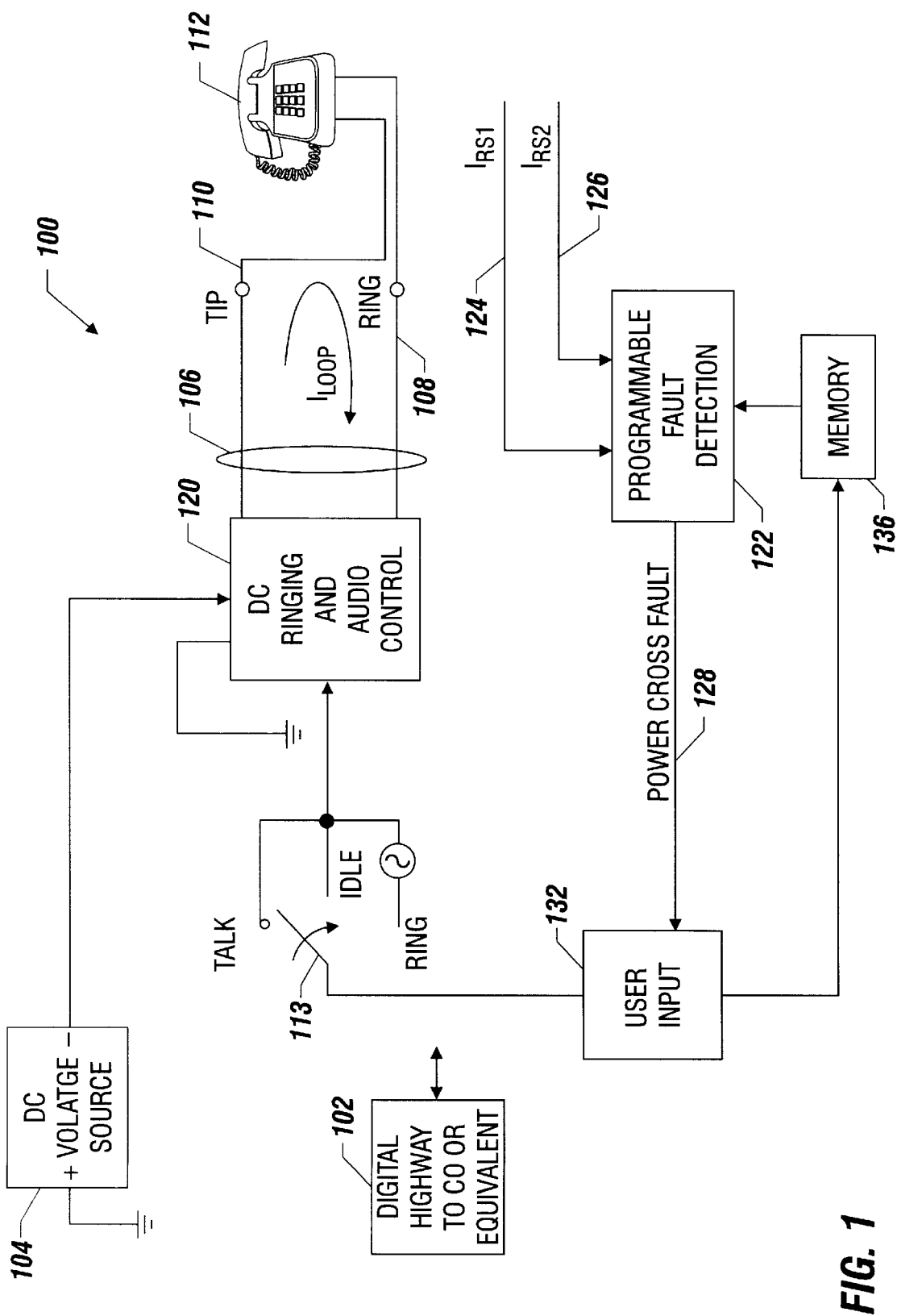
FIG. 1 is a block diagram of one embodiment of a telephone subscriber line and ring mode fault detection arrangement in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention generally provides a system and method for providing software-implemented testing of telephone subscriber line power conditions during ring mode using programmable fault thresholds.

FIG. 1 is a block diagram of one embodiment of a telephone subscriber line and ring mode fault detection arrangement 100 in accordance with the present invention. The circuit 100 resides at the central office of the telephone company, or may alternatively reside at a more remote location from the central office such as a neighborhood or curbside pedestal, which is connected to the central office via a digital highway 102 either directly or through a wireless link. The central office (CO) represents the telephone line switching center that terminates and interconnects telephone lines and trunks from users. The central office, or other station providing an equivalent service, applies various DC voltages to the two-wire phone loop. The DC voltage is provided by the DC voltage source 104, and typically provides a negative voltage onto the two-wire loop 106. The two-wire phone loop 106 includes the ring line 108 and tip line 110, which provide the communication and power connection to customer premises equipment (CPE), represented in FIG. 1 by the telephone 112.

The two-wire telephone loop 106, commonly referred to as the subscriber loop, can be on the order of three to four miles of 0.22 AWG copper wire. Although copper is a good conductor, the subscriber loop has an inherent resistance in addition to a resistance value that is switched into the loop. The total resistance of the loop therefore has a value which is partly inherent to the conductor characteristics, and partly dependent on the state of operation in which the telephone is being used.

There are several different states in which the phone line operates, depending upon what action is presently being taken with respect to any of the telephonic devices being used by the subscribers. Among these different states are the "talk", "idle", and "ring" communication states, symbolically distinguished in FIG. 1 by switch 113. In the idle state, the central office typically applies −48 (+/−6) volts DC on the ring line 108. There is typically a resistance applied on the local loop during idle mode, as well additional external line resistance between the central office and the subscriber.

When in the talk mode, central office typically applies voltages of −43 volts to −79 volts DC on the ring line 108. In talk mode, the feed characteristics may be optimized according to programmable parameters set by the user. As is well known in the art, voice audio signals are superimposed on the DC voltage presented on the ring and tip lines 108, 110.

The ring state is used by the central office to alert a subscriber of an incoming telephone call, which in the U.S. normally includes a cadence of 2 seconds of ringing and 4 seconds of pause. When the telephone connection is in the ring state, the central office typically applies approximately 86 volt rms, at a frequency between 15 and 68 Hz (typically 20 Hz), on top of the usual −48 volt DC bias to generate the ring signal. The line voltage and current is therefore different than when the connection is in idle or talk mode. Furthermore, the ring signal voltage may vary at the subscriber end of the connection based upon the loop length and the number of ringers attached to the line.

While these resistances and voltages vary somewhat, thereby changing the current at the customer premises, expected normal current ranges during ringing can be determined for the subscriber's telephony equipment. Those currents falling outside of the expected range may indicate a fault situation. The present invention concerns detection of such fault conditions which may affect the operation or cause CPE damage susceptibility while the connection is in ring mode. DC faults and AC faults during other connection states, such as the idle state, are described in copending U.S. patent application, Ser. No. 08/897,986, entitled "System And Method For Programmable Telephone Subscriber Line Test", which is assigned to the assignee of the instant application. Separate fault detection is used in ring mode due to a unique situation requiring a distinction between a power cross fault during ringing and a normal ring trip caused by a telephonic device switching to the off-hook state while in ring mode, and also due to the removal of normal fault detection circuits when the ringing circuit is called on to provide the ring signal. The power cross fault refers to a fault condition that includes the corruption of a telephone line with a deviant AC current while in ring mode. Such a deviant AC current is typically caused by a short-circuit between the telephone line and an electric power line.

Another mode in which the telephone line operates is a test mode, where the central office utilizes dedicated test circuitry to apply various AC and DC test signals to make sure that the network is working properly. It is, however, desirable to provide line test capabilities to identify faults on the line or line circuit without involvement of separate circuitry at the central office. The present invention includes a subscriber line interface and programmable fault detection circuitry 122 to provide an integrated test capability at the subscriber portion of the subscriber loop. The programmable fault detection capabilities of the present invention provides for software-programmable functions, which is beneficial in a variety of situations including world-wide application where telephone line characteristics and fault conditions may differ, and for remote applications where dedicated test hardware is not cost effective.

The DC ringing and audio control circuit 120 is part of a subscriber line interface that provides the power necessary to drive a wide variety of subscriber lines. The DC ringing and audio control circuit 120 receives an analog signal having two components. First, a DC component is present, which controls how much loop or metallic current is flowing in the loop. The other current is an AC voice current superimposed on the DC component. The current is input to the DC ringing and audio control circuit 120, where it is amplified and presented differentially in the tip/ring local loop 106.

The programmable fault detection circuit 122 receives currents $I_{RG1}$ and $I_{RS2}$ on lines 124 and 126 respectively, which correspond to currents generated by voltages on each side of a ring feed resistance. The ring feed resistance is a resistance switched into the line during ring mode so that a known ring mode current can be calculated. A change from this current indicates that the telephone has been placed in the off-hook position. The programmable fault detection circuit 122 uses the currents $I_{RG1}$ and $I_{RS2}$ to determine whether a power cross condition is present, in which case a power cross fault shown on line 128 is generated and provided to the subscriber line interface 120 to be reported to the central office. The manner in which the power cross fault is identified and handled is described in further detail below.

The programmable fault detection circuitry 122 allows for software-programmable threshold values. Desired threshold values may be entered by a user at the user input 132. In one embodiment of the invention, the threshold values are entered via user input 132 using commands with command parameters corresponding to the programmable threshold value. The threshold values may alternatively be generated through the use of an analog-to-digital converter, a stored table of values accessed according to the input string provided, or via other known means. The digital threshold value can be generated in real-time, or can be stored in the memory 136 for later use. In one embodiment of the invention, threshold values for each of the AC and DC faults are stored in the memory 136, and are used by the programmable fault detection circuitry 122 in ascertaining whether a fault exists.

Figure 2:
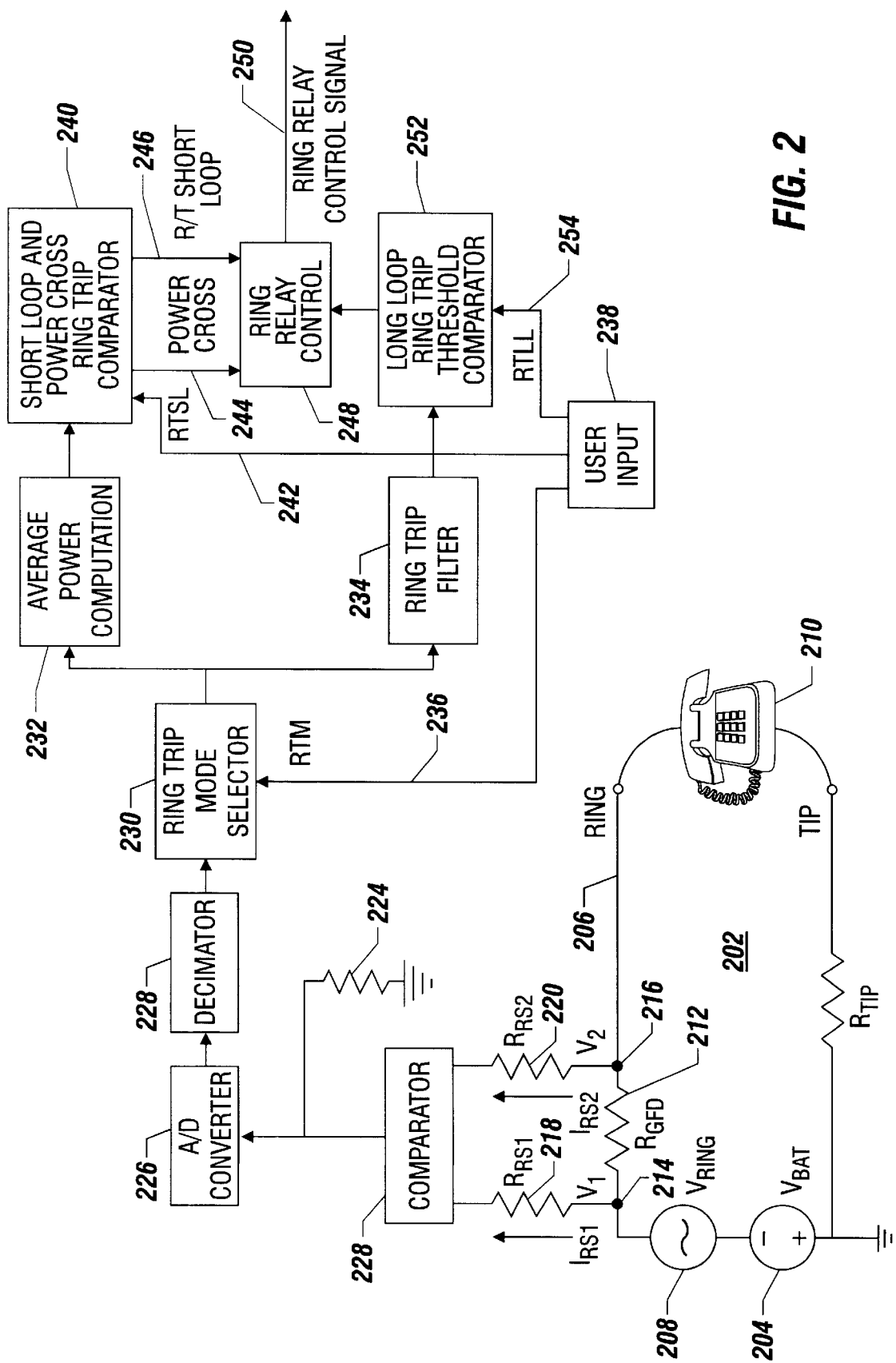
FIG. 2 is a block diagram of one embodiment of a power cross detection circuit used to detect subscriber line faults during ringing in accordance with the present invention.

FIG. 2 is a block diagram of one embodiment of a power cross detection circuit 200 used to detect subscriber line faults during ringing in accordance with the present invention. The subscriber loop 202 illustrated includes two voltage sources. The first voltage source is the DC voltage source $V_{BAT}$ 204, which, as previously described, applies a negative DC supply voltage to the ring line 206. In this embodiment, the AC ring voltage $V_{RING}$ 208 is externally applied by the central office during ring mode, and is typically an 86-volt root-mean-square (RMS) signal at a frequency of approximately 20 Hz. Other frequencies, voltages and ringing DC polarity schemes are possible, and can be managed by the present invention. The AC ring voltage signal is typically switched-in when entering ring mode through the use of a ring relay which removes other interface circuitry from the loop when activated. The $V_{RING}$ oscillating voltage signal is applied to the ring line 206 on top of the DC bias provided by the voltage $V_{BAT}$.

It should be recognized that there are alternative methods of providing the ring signal $V_{RING}$ without using an external relay, without departing from the scope and spirit of the invention. For example, internal ring signal generation may be used instead of the external $V_{RING}$ signal embodiment described in FIG. 2. For example, an internal ring signal generator can be included which provides a ring signal to the power cross detection circuit 200 rather than switching in the $V_{RING}$ 208. Such an internal ring signal generator monitors the metallic current $I_{MT}$, which refers to the differential current through the subscriber loop. The metallic current changes during ringing, and an internal ring signal generator provides this current to the average power computation circuit 232 and the ring trip filter 234, which will be described in further detail below.

When the ringing voltage has been switched into the series subscriber loop during ring mode, the DC portion of the signal is blocked from providing current through any telephonic devices 210 coupled to the loop 202. When a user places the telephone 210 in an off-hook state by answering it, the DC portion of the voltage signal on the ring line 206 completes a current path through the closed switch in the telephone. The central office is notified of the increase in DC current draw, which allows the central office to identify the telephone as off-hook. This is generally referred to as the "ring trip" condition, where placing the telephone in the off-hook state during ringing allows the ring circuit at the central office to remove the ring voltage $V_{RING}$ and place the loop in the talk state.

The current in the loop 202 can be monitored by determining the voltage drop across the ring feed resistor $R_{GFD}$ 212. Although the measured current may reveal that a ring trip occurred, it can also be used to detect a power cross fault condition. Normal AC and DC fault detection circuitry used to detect faults when the connection is not in ring mode are ineffective while in ring mode because these circuits are switched out during ring mode. Also, any surge protection is disconnected from the telephone line during ringing. Furthermore, when a low level AC electrical power cross occurs (e.g., a short-circuit to a 50/60 Hz electrical signal), the normal ring trip circuitry of the present invention may detect it and immediately release the ring relay. However, for higher power cross levels, the normal ring trip may not function due to overload of the analog-to-digital (A/D) converters, which requires an independent method of detecting a power cross during ring trip.

The current through the ring feed resistor $R_{GFD}$ 212 can be determined by measuring the voltages at node $V_1$ 214 and $V_2$ 216. Currents $I_{RS1}$ and $I_{RS2}$ may be generated which are proportional to voltages $V_1$ 214 and $V_2$ 216 by utilizing resistances $R_{RS1}$ 218 and $R_{RS2}$ 220. These currents are compared at comparator 222 to determine the difference in current between $I_{RS1}$ and $I_{RS2}$, which allow for calculation of the current through $R_{GFD}$ 212. The comparator 222 provides the current difference signal through resistance 224 to the A/D converter 226, which in turn provides a digital equivalent of the voltage drop across $R_{GFD}$ 212. As would be apparent to those skilled in the art from the foregoing description, the analog-to-digital conversion represented by A/D converter 226 could take place prior to comparing the signals via comparator 222, with the added step of converting two signals to their digital equivalents.

The A/D converter 226 provides a digital value which is proportional to the current flowing through $R_{GFD}$ to the decimator 228. The decimator 228 may be used as shown in order to filter off certain high frequency components, by filtering and averaging the input sample rate and providing a lower sample rate in response thereto. This value is fed into the ring trip mode selector 230, which appropriately outputs information to the average power computation block 232 and the ring trip filter 234, according to the ring trip mode (RTM) configuration signal shown on line 236. The RTM signal is provided by way of a user input 238 to provide programmability for the power cross detection circuit 200. The user input 238 includes a user interface device such as a keyboard, or the user input may be embedded in a predefined control program. The user input 238 also includes a processing unit capable of receiving user input information and generating configuration signals in response thereto. The RTM signal determines whether the ring trip mode selector 230 outputs the AC ring signal with a DC offset or not. A full wave rectified (absolute value) of the signal can be sent to the ring trip filter in cases of short loops where a sufficient difference between off-hook and on-hook ringing current exists.

The signal output from the ring trip mode selector 230 represents the ringing current in the subscriber loop, which feeds both the average power computation unit 232 and the ring trip filter 234. These two paths guarantee power cross detection during ringing even if the ring trip filter becomes overloaded, due to high power cross levels. Both the average power computation unit 232 and the ring trip filter 234 provide ring trip. The difference is that the ring trip filter 234 operates for all loop lengths but, because of A/D converter overload, may not provide reliable ring trip during a power cross. The average power computation block 232 is used to generate a ring trip for short loops, but will also provide a ring trip during a power cross.

The average power computation unit 232 provides a ring trip signal to the short loop and power cross ring trip comparator 240 for short loops and in power cross conditions. The average power computation unit 232 computes the average power in the ringing current waveform over one cycle of ringing in one embodiment of the invention. The result of this computation is compared to a programmable ring trip threshold, shown on line 242 as the ring trip short loop (RTSL) signal from the user input 238. The RTSL threshold is programmed to a much higher current value than is normally required for a ring trip signal, which in one embodiment of the invention is approximately 100 mA.

Programming this threshold to a higher value prevents false ring trip caused by high AC current flowing through multiple ringers on a short loop. However, the short loop and power cross ring trip comparator 240 can detect a power cross, as it computes the average power of a full wave rectified signal independent of A/D overload. The short loop and power cross ring trip comparator 240 initiates a ring trip for short loops as well as for power cross faults. The use of different circuits for short and long loops is due in part to the ability to distinguish between on-hook and off-hook using the current value through the ring feed resistor. In a long loop, the on-hook and off-hook current range can overlap based on the length of the subscriber line and the number of telephones on that line.

A power cross signal or a ring trip short loop signal on lines 244 and 246 respectively are provided to the ring relay control unit 248, which provides the ring relay control signal on line 250 which is presented to a ring relay at the central office ring circuit in order to disable the ring circuit.

The ring trip filter 234 provides ring trip for long loops. The ring trip filter 234 removes the AC component from the ringing current signal to provide more accurate detection of the DC component. Because long subscriber loops are involved in this path, the ring trip long loop (RTLL) threshold value from the user input 238 is programmed to a lower current value, which in one embodiment of the invention is approximately 10 mA. The RTLL signal is compared to the filtered signal from the ring trip filter 234 at the long loop ring trip threshold comparator 252. The comparator 252 provides a signal to a ring relay control 248 to generate a ring relay control signal on line 250 when the filtered signal from the ring trip filter 234 becomes greater than the RTLL threshold on line 254 from the user input 238.

A debounce circuit may be coupled in series between the long loop ring trip threshold comparator 252 and the ring relay control 248 in order to minimize false ring trip signals. In one embodiment of the invention, the threshold RTLL must be exceeded for longer than 20 ms in order to indicate a valid ring trip.

In one embodiment of the invention, the ring trip filter 234 has a bandwidth of approximately 2 Hz and removes enough of the ringing ripple so that a reliable ring trip can be detected by the threshold detector. The ring trip filter 234 reduces the AC component to a point where the filtered output can be compared to the threshold voltage and reliably determine when a ring trip has occurred. In one embodiment of the invention, the ring trip filter 234 provides a high level of filtering required for reliable ring trip detection for long loops, which is described in this particular example by the following transfer functions:

$$HRTF(z) = H2(z) \cdot \frac{a_0}{1 + a_1 \cdot z^{-1} + a \cdot z^{-2}} \quad \text{[Eq. 1]}$$

where $a_0 = 0.00390625$;

$a_1 = -1.9375$;

$a_2 = 0.941406$;

sampling rate=250 Hz $$H2 = \left(\sum_k z^{-k}\right) \cdot \frac{1}{16};  \quad [\text{Eq. 2}]$$

where k=0 . . . 15

Figure 3:
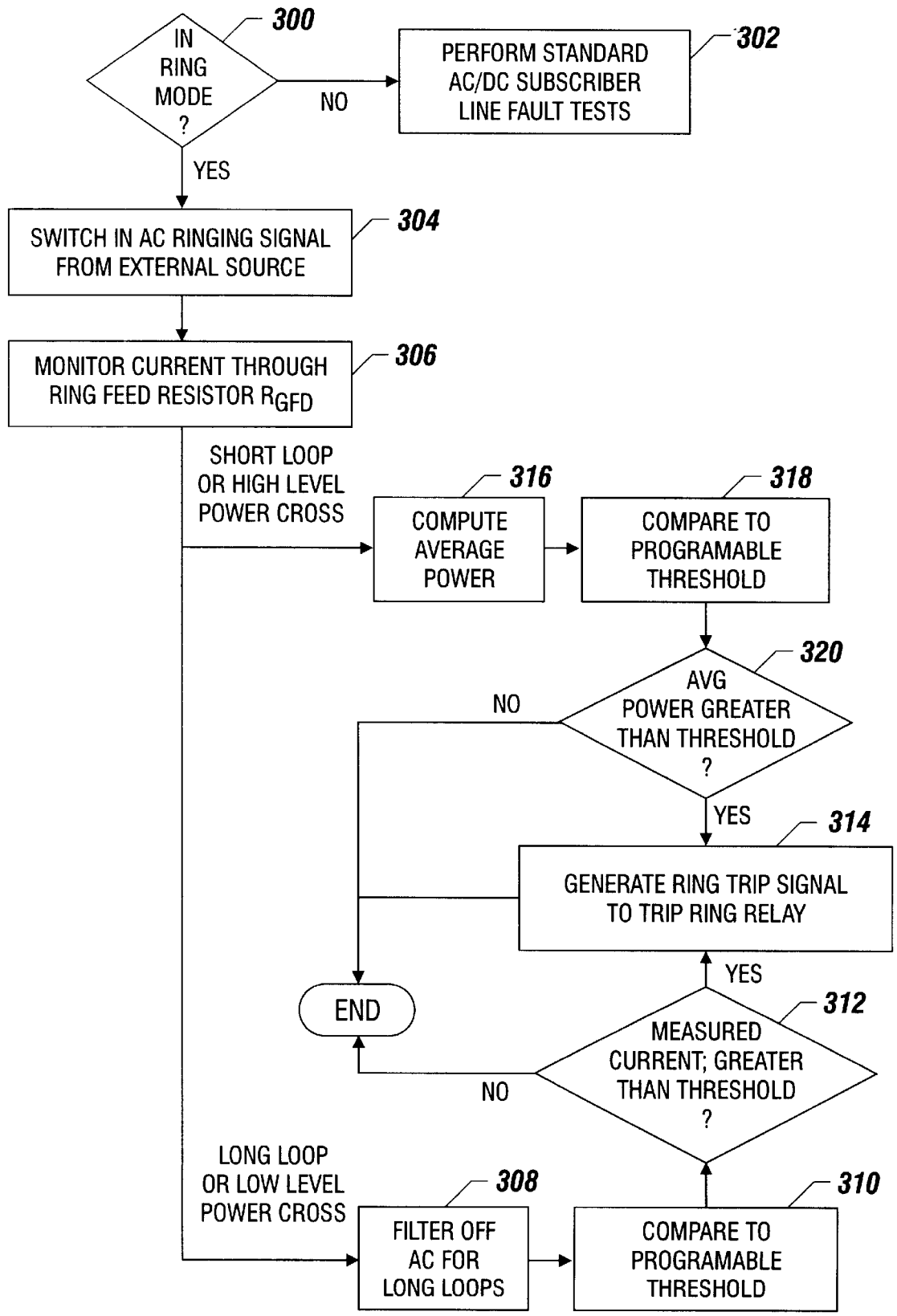
FIG. 3 is a flow diagram illustrating one embodiment of the power cross detection and ring relay control.

Referring now to FIG. 3, a flow diagram illustrating one embodiment of the power cross detection and ring relay control is provided. Ring mode is activated when a call is signaled by the central office to a particular subscriber on the local loop. When the telephone connection is not in ring mode 300, standard AC/DC subscriber line fault tests are performed 302.

Where the telephone connection is in ring mode 300, the AC ringing signal from the external ring voltage source is switched-in 304 in order to provide an indication on the local loop to the subscriber that an incoming call is being attempted. The ring relay is to be tripped upon detection of the subscriber receiving the call by placing the telephone in an off-hook mode, or upon the occurrence of a power cross fault. This is accomplished by monitoring 306 the current through the ring feed resister $R_{GFD}$. Where the subscriber loop is a long loop, the AC component is filtered off 308, and compared 310 to a programmable threshold value corresponding to a reference value indicating that the telephone at the subscriber location has been changed to the off-hook state. The occurrence of a low level power cross fault, which does not overload the A/D converters, may also be recognized as a ring trip signal. Where the measured current is greater than the programmable threshold, as determined at block 312, a ring trip signal to the ring relay is generated 314 to disable the ring mode. Where the measured current is not greater than the threshold, no further action is taken with respect to the ring relay.

For a short subscriber loop or a high level power cross, the average power in the ringing current waveform over one cycle of ringing is computed 316. The result of this computation is compared 318 to a programmable threshold value. If the average power computed is not greater than the programmable threshold, as determined at block 320, no ring trip signals are provided to the ring relay. Where the average power is determined 320 to be greater than the programmable threshold, the ring trip signal to the trip ring relay is generated 314.

Figure 4:
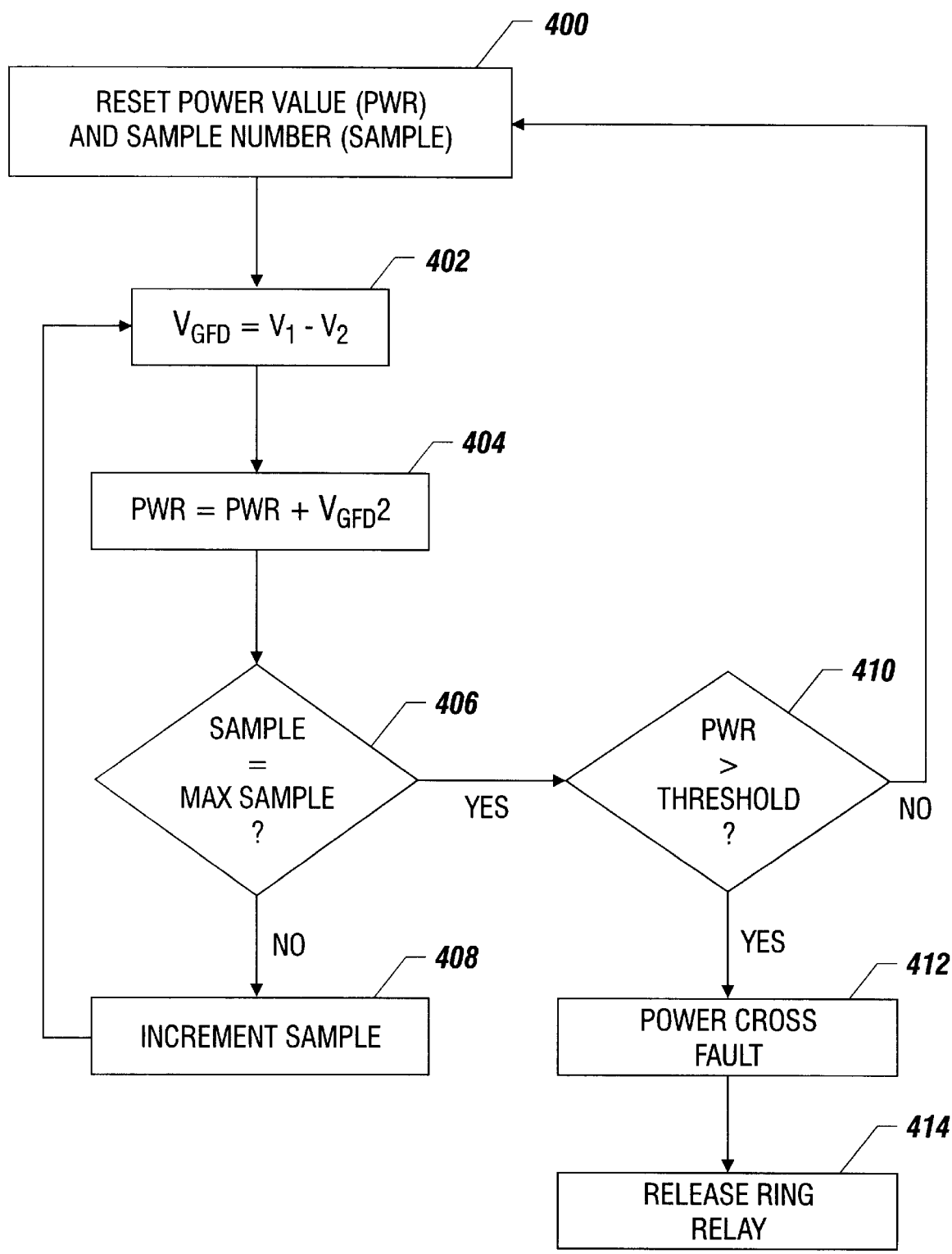
FIG. 4 is a flow diagram illustrating a programmable sampling algorithm in accordance with the present invention for determining whether a power cross fault has occurred.

FIG. 4 is a flow diagram illustrating a programmable sampling algorithm in accordance with the present invention for determining whether a power cross fault has occurred. The power value and sample number are reset 400 to a predetermined number, typically zero. The voltage across the ring feed resister, labeled $V_{GFD}$, is equal to $V_1-V_2$, as seen at block 402. The voltages $V_1$ and $V_2$ correspond to the voltages at opposite ends of the ring feed resistor, the difference of which represents the voltage drop across the ring feed resistor. The voltage drop across the ring feed resistor is directly proportional to the telephone line current in the two-wire subscriber loop. The power value at a first sample number is calculated 404. This power value accounts for the power calculated at each of a plurality of samples, and can be computed as a sum of all of the power value samples, an average power computation, or other directly proportional power value. The power value shown in block 404 is calculated by adding a current power value total to the square of the voltage drop across the ring feed resistor. The exact power calculation or manner of determining the power value may be changed, as long as the threshold value which is to be compared to the power value is accordingly changed.

It is determined 406 whether the sample number is equal to a programmable maximum sample value. If not, the sample value is incremented 408, and the power value calculation continues until it is determined 406 that the sample value has reached the programmed maximum sample value. When the sample value has reached the maximum sample value, it is determined 410 whether the power value is greater than the programmable threshold which would indicate the presence of a power cross fault. If the power value has not exceeded the threshold value, the power value and sample number are again reset 400. If the power value is greater than the threshold value, a power cross fault is identified 412 and the ring relay is disabled 414, thereby removing the telephone line connection from the ring mode.

Figure 5:
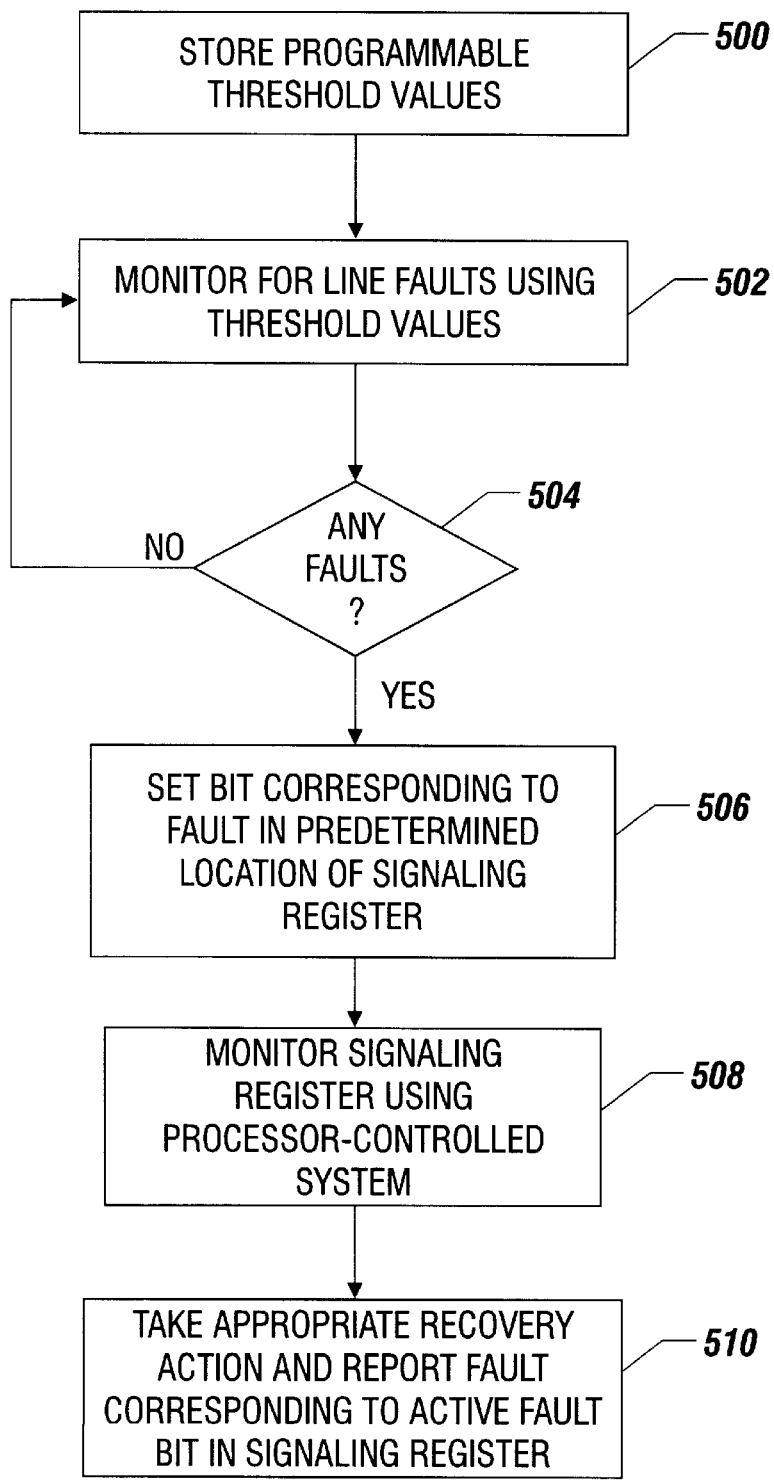
FIG. 5 is a flow diagram illustrating one embodiment of the programmable nature of the power cross detection and fault reporting during ringing in accordance with the present invention.

Referring now to FIG. 5, a flow diagram illustrating one embodiment of the programmable nature of the power cross detection and fault reporting during ringing is illustrated. In this embodiment, faults are detected and reported as well as providing a ring trip upon detecting a power cross condition.

A variety of different predetermined threshold values, corresponding to fault reference points, are stored 500 in a memory device. These threshold values are software-programmable, thereby conserving semiconductor real estate and cost, as well as providing flexibility of use.

Subscriber loop line voltage and current characteristics are monitored 502 using the fault references corresponding to the predetermined threshold values stored in the memory device. Where no subscriber loop faults are detected 504, the programmable fault detection circuitry continues to monitor 502 for line faults using the predetermined threshold values. Where faults are detected 504, the presence of the fault is registered. In one embodiment, a bit corresponding to the fault is set 506 in a predetermined location of a signaling register or other memory location. The fault bit represents a flag for the particular subscriber loop fault which it represents.

In one embodiment of the invention, a processor-controlled system is used to monitor 508 the signaling register to act on the particular subscriber line fault which has been set forth in the signaling register or other memory location. The monitoring of the register may be accomplished by way of periodic software polling. Other embodiments for monitoring the signaling register may also be used, including generating interrupts for use in an interrupt-controlled processing system.

The processor-controlled system may be programmed to take an appropriate recovery action and identify the fault, as indicated at block 510. The recovery action and fault reporting is based on the particular one of the bit identifiers set in the signaling register. In the case of an interrupt-driven system, a particular interrupt routine can be initiated upon the occurrence of the corresponding interrupt. Recovery actions include, among other things, reporting the fault to the central office to indicate that repair is necessary.

As noted above, the present invention provides a system and method for providing software-implemented testing of telephone subscriber line power conditions during ring mode using programmable fault thresholds. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A user-controlled fault detection system for detecting subscriber line faults on a telephone subscriber line during a ring mode, comprising:

a user interface adapted to enter user-programmable threshold values corresponding to subscriber ring mode line fault conditions;

a fault threshold memory, coupled to the user interface, and adapted to store the entered threshold values;

a current level detector adapted to identify a ring mode current during ringing on the telephone subscriber line; and a processing unit adapted to compare the ring mode current on the telephone subscriber line to the entered threshold values stored in the fault threshold memory, and to identify an occurrence of a fault as distinguished from an off-hook condition on the subscriber line in response thereto.

2. The user-controlled fault detection system of claim 1, wherein the current level detector comprises:

a comparator adapted to determine a voltage drop across a ring feed resistor in series with the telephone subscriber line; and an analog-to-digital converter adapted to generate a digital current representation proportional to the ring mode current.

3. The user-controlled fault detection system of claim 1, further comprising:

a ring relay control circuit adapted to provide a ring trip signal to deactivate the ring mode upon identifying the occurrence of the fault.

4. A user-controlled fault detection system for detecting power cross faults on a telephone subscriber line during a ring mode, comprising:

a current level detector adapted to identify a ring mode current during ringing on the telephone subscriber line;

a power computation unit adapted to compute a power value for the ring mode current;

a user interface adapted to enter user-programmable threshold values corresponding to subscriber line power cross conditions; and a comparator adapted to receive the power value and a corresponding one of the user-programmable threshold values, to provide a ring mode power cross fault indication when the power value reaches the user-programmable threshold value, wherein the user-programmable threshold values are modifiably set to distinguish power cross conditions from a normal off-hook condition on the subscriber line.

5. The user-controlled fault detection system of claim 4, further comprising:

a ring trip filter, coupled in parallel to the power computation unit, and adapted to filter off an AC component of the ring mode current and output a DC current component; and a second comparator adapted to receive the DC current component and a corresponding one of the user-programmable threshold values, and to provide a ring trip signal for low-power power cross faults.

6. The user-controlled fault detection system of claim 4, further comprising:

a ring relay control circuit adapted to provide the ring mode power cross fault indication to a ring mode switch to deactivate the ring mode.

7. The user-controlled fault detection system claim 4, wherein the comparator is implemented using a software-programmable processing system.

8. The user-controlled fault detection system of claim 4, wherein the telephone subscriber line comprises a two-wire cable adapted to transmit standard telephone audio signals and data.

9. The user-controlled fault detection system of claim 4, wherein the power computation unit comprises:

a software-implemented signal quantifier adapted to generate a value proportional to a phase-independent, steady-state representation of an AC signal on the telephone subscriber line.

10. A method for identifying power cross faults on a telephone subscriber line during a ring mode, comprising:

generating software-programmable digital power cross fault threshold values corresponding to telephone subscriber line power cross fault levels in response to a user input;

computing digital values through digital sampling of actual current signals on the telephone subscriber line;

performing a software-executed comparison of the digital values collected from the telephone subscriber line and the digital power cross fault threshold values; and deactivating the ring mode when the digital values surpass the digital power cross fault threshold values.

11. The method of claim 10, further comprising:

entering a command having parameters corresponding to the telephone subscriber line power cross fault level.

12. The method of claim 10, wherein generating software-programmable digital power cross fault threshold values further comprises:

converting analog user input to the digital power cross fault threshold values.

13. The method of claim 10, wherein computing digital values through digital sampling further comprises:

computing a digital value which is proportional to a power quantity on the telephone subscriber line.

14. The method of claim 10, wherein deactivating the ring mode further comprises:

signaling a switch to disconnect ring mode power to the telephone subscriber line.

15. A method for identifying current faults on a telephone subscriber line in a ring mode, comprising;

identifying a ring mode current during ringing on the telephone subscriber line;

sampling the ring mode current at a sampling rate to provide a corresponding digital ring mode current;

calculating a phase-independent digital value corresponding to a phase-independent representation of the digital ring mode current;

comparing the phase-independent digital value to a programmable power cross threshold value; and deactivating the ring mode in response to the phase-independent digital value reaching the programmable power cross threshold value.

\* \* \* \* \*